(12) United States Patent
Menard et al.

(10) Patent No.: US 12,340,689 B2
(45) Date of Patent: Jun. 24, 2025

(54) DYNAMIC TRAFFIC MANAGEMENT USING DISPARATE DATA SOURCES

(71) Applicant: SinWaves Inc., Santa Clara, CA (US)

(72) Inventors: Timothy Menard, Santa Clara, CA (US); Dustin Harber, Santa Clara, CA (US)

(73) Assignee: SinWaves Inc., Santa Clara, CA (US)

( * ) Notice: Subject to any disclaimer, the term of this patent is extended or adjusted under 35 U.S.C. 154(b) by 86 days.

(21) Appl. No.: 17/982,520

(22) Filed: Nov. 8, 2022

(65) Prior Publication Data

US 2023/0146697 A1 May 11, 2023

Related U.S. Application Data

(60) Provisional application No. 63/278,261, filed on Nov. 11, 2021.

(51) Int. Cl.
*G08G 1/07* (2006.01)
*G06N 5/022* (2023.01)

(52) U.S. Cl.
CPC ............... *G08G 1/07* (2013.01); *G06N 5/022* (2013.01)

(58) Field of Classification Search
CPC ................................ G08G 1/07; G06N 5/022
USPC ........................................................ 340/910
See application file for complete search history.

(56) References Cited

U.S. PATENT DOCUMENTS

| | | | | |
|---|---|---|---|---|
| 10,937,310 | B2* | 3/2021 | Mueck | G08G 1/07 |
| 2011/0258135 | A1* | 10/2011 | Paul | G06Q 10/08 |
| | | | | 705/338 |
| 2017/0270413 | A1* | 9/2017 | Moreira-Matias | G08G 1/0129 |
| 2020/0020227 | A1* | 1/2020 | Ran | G08G 1/075 |
| 2020/0244653 | A1* | 7/2020 | Eichelberger | H04L 63/1425 |
| 2021/0349204 | A1* | 11/2021 | Brodsky | G08G 1/054 |

* cited by examiner

*Primary Examiner* — Kerri L McNally
(74) *Attorney, Agent, or Firm* — Steven Stupp

(57) ABSTRACT

A computer system that performs a remedial action is described. During operation, the computer system may receive information corresponding to traffic conditions in an environment (such as traffic flows in at least a portion of a city), where the information is associated with different types of sources distributed in the environment, and the environment includes multiple intersections and roadways. Then, the computer system may identify an event in at least a portion of the environment based at least in part on the information, such as predicting a change in a traffic condition in the environment in a subsequent time interval. Next, the computer system may perform a remedial action based at least in part on the identified event, such as: providing an alert about the event; providing an instruction based at least in part on the event; and/or modifying traffic management in at least the portion of the environment.

20 Claims, 9 Drawing Sheets

```
                                          ┌─ 600

┌─────────────────────────┐
        │   RECEIVE INFORMATION   │
        │           610           │
        └────────────┬────────────┘
                     ▼
        ┌─────────────────────────┐
        │ RECEIVE SECOND INFORMATION │
        │           612           │
        └────────────┬────────────┘
                     ▼
        ┌─────────────────────────┐
        │  DYNAMICALLY AGGREGATE  │
        │ VEHICLES INTO A GROUP OF│
        │        VEHCILES         │
        │           614           │
        └─────────────────────────┘
```

DYNAMIC TRAFFIC MANAGEMENT USING DISPARATE DATA SOURCES

CROSS REFERENCE TO RELATED APPLICATIONS

This application claims priority under 35 U.S.C. 119(e) to U.S. Provisional Application Ser. No. 63/278,261, "Dynamic Traffic Management Using Disparate Data Sources," filed on Nov. 11, 2021, by Timothy Menard, et al., the contents of which are herein incorporated by reference.

FIELD

The described embodiments relate generally to techniques for dynamic traffic management in an environment based at least in part on disparate real-time data sources.

BACKGROUND

The large number of vehicles on roadways often results in traffic congestion. These obstructions to traffic flow are time-consuming, frustrating to drivers and passengers, increase business expenses, and typically result in increased pollution levels.

In principle, traffic-management systems can be used to reduce traffic congestion and the associated negative consequences. For example, many municipalities have installed cameras or sensors at intersections, which can be used to monitor traffic flow through an intersection and detect accidents. Moreover, the intersection cameras can be used to selectively adjust traffic-signal timing. Notably, infrared-signal-based preemption may be performed for emergency vehicles or mass-transit vehicles (such as buses).

However, existing intersection preemption systems typically require a camera or sensor to be installed at every intersection and corresponding transmitters to be included in the emergency vehicles or mass-transit vehicles. These features increase the cost and complexity of these systems. Moreover, intersection preemption systems are usually based on line-of-sight, so that they often only respond to local traffic conditions for a vehicle in the immediate field of view. Furthermore, depending on where an individual traffic signal is in its cycle and the overall traffic conditions in an environment (such as a city or a municipality), adjusting the traffic signal may end up being counterproductive for an emergency vehicle or a mass-transit vehicle and/or for other vehicles on the roadways (e.g., traffic delays may be increased). In addition, a sudden change from the usual signal timing or pattern can confuse drivers, thereby increasing the risk of an accident.

SUMMARY

In a first group of embodiments, a computer system that performs a remedial action is described. This computer system may include: an interface circuit that communicates with electronic devices (which may be remotely located from the computer system); a processor; and memory that stores program instructions and a data structure. During operation, the computer system receives information corresponding to traffic conditions in an environment (such as traffic flows), where the information is associated with different types of sources distributed in the environment, and the environment includes multiple intersections and roadways. Then, the computer system identifies an event in at least a portion of the environment based at least in part on the information. Next, the computer system performs a remedial action based at least in part on the identified event.

Note that the environment may include at least a portion of a city or a municipality.

Moreover, identifying the event may be based at least in part on historical traffic conditions in the environment.

Furthermore, identifying the event may include predicting a change in a traffic condition in the environment in a subsequent time interval. Alternatively or additionally, identifying the event may include determining a change in the traffic conditions after the predicted change has occurred. In some embodiments, identifying the event may include comparing the traffic conditions to predefined signatures of different types of events. Note that identifying the event may be based at least in part on a pretrained predictive model, such as a machine-learning model or a neural network.

Note that at least some of the information may include real-time information, such as information that is received as it is acquired by a given type of source.

Moreover, receiving the information may include accessing the information in memory associated with the computer system and/or receiving the information from the different types of sources.

Furthermore, the remedial action may include: providing an alert about the event (e.g., to drivers in at least the portion of the environment); providing an instruction based at least in part on the event (e.g., to the drivers in at least the portion of the environment); and/or modifying traffic management (such as road signage, traffic signal timing, etc.) in at least the portion of the environment. For example, when the event includes an accident at a location in the environment, the modification to the traffic management may dynamically reduce a probability of a future occurrence of an accident at the location. Alternatively or additionally, the alert or the instruction may be provided to delivery vehicles, such as trucks, unmanned drones or robots. In some embodiments, the alert or the instructions is based at least in part on a predicted impact of or corresponding to the event on a future traffic condition, e.g., because of a modification in traffic management associated with the event. Moreover, modifying the traffic management may include changing: a number of vehicles in a group of vehicles allowed through an intersection during a traffic-signal cycle and/or a spacing between vehicles in the group.

Additionally, the event may or may not be other than a traffic event and may impact the traffic conditions. For example, the event may include one or more of: a sporting event, an entertainment event, a weather condition, an accident, etc.

In some embodiments, the types of data sources may include data associated with one or more of: emergency services calls, municipal or private vehicles (such as emergency-services vehicles, waste-removal vehicles, public-works vehicles, vehicles associated with another municipal agency, etc.), navigation software, mass transit systems (such as mass-transit vehicles, trains, buses, etc.), rideshare software or rideshare vehicles, calendar software (such as the planned or future schedules of one or more individuals or organizations), parking meters, parking lots, etc.

Moreover, the remedial action may include dynamically controlling traffic flows between different predefined regions in the environment based at least in part on predefined traffic parameters or constraints.

Another embodiment provides a computer-readable storage medium for use with the computer system. When executed by the computer system, this computer-readable storage medium causes the computer system to perform at least some of the aforementioned operations.

Another embodiment provides a method that may be performed by the computer system. This method includes at least some of the aforementioned operations.

In a second group of embodiments, a computer system that determines whether information is self-consistent is described. This computer system may include: an interface circuit that communicates with electronic devices (which may be remotely located from the computer system); a processor; and memory that stores program instructions and a data structure. During operation, the computer system receives information corresponding to traffic conditions in an environment (such as traffic flows), where the information is associated with different types of sources distributed in the environment, and the environment includes multiple intersections and roadways. Then, the computer system determines whether the information is self-consistent. Next, the computer system selectively performs a remedial action when at least some of the information is not self-consistent.

Note that the environment may include at least a portion of a city or a municipality.

Moreover, at least some of the information associated with the different types of sources is redundant. For example, at least some of the redundant information is associated with a traffic condition in the environment and/or an intersection or roadway in the environment.

Furthermore, determining whether the information is self-consistent may be based at least in part on predefined rules associated with historical traffic conditions in the environment. Additionally, determining whether the information is self-consistent may be based at least in part on differences with the historical traffic conditions and/or a predicted traffic condition in the environment.

In some embodiments, determining whether the information is self-consistent may be based at least in part on a pretrained predictive model. For example, the pretrained predictive model may include a machine-learning model or a neural network.

Moreover, when the information is not self-consistent, the remedial action may include excluding: conflicting data in the information; and/or redundant data in the information (such as duplicate or temporally repeating data). Alternatively or additionally, the remedial action may include bounding or limiting a modification to traffic management (such as road signage, traffic signal timing, etc.) in at least a portion of the environment based at least in part on the information.

Note that the types of data sources may include data associated with one or more of: emergency services calls, municipal or private vehicles (such as emergency-services vehicles, waste-removal vehicles, public-works vehicles, vehicles associated with another municipal agency, etc.), navigation software, mass transit systems (such as mass-transit vehicles, trains, buses, etc.), rideshare software or rideshare vehicles, calendar software (such as the planned or future schedules of one or more individuals or organizations), parking meters, parking lots, etc.

Another embodiment provides a computer-readable storage medium for use with the computer system. When executed by the computer system, this computer-readable storage medium causes the computer system to perform at least some of the aforementioned operations.

Another embodiment provides a method that may be performed by the computer system. This method includes at least some of the aforementioned operations.

In a third group of embodiments, a computer system that dynamically aggregates vehicles into a group of vehicles is described. This computer system may include: an interface circuit that communicates with electronic devices (which may be remotely located from the computer system); a processor; and memory that stores program instructions and a data structure. During operation, the computer system receives information corresponding to traffic conditions in an environment (such as traffic flows), where the information is associated with different types of sources distributed in the environment, and the environment includes multiple intersections and roadways. Then, the computer system receives second information corresponding to start locations in the environment of the vehicles and destination locations in the environment of the vehicles. Moreover, the computer system dynamically aggregates the vehicles into the group of vehicles based at least in part on the traffic conditions, the start locations and the destination locations. Next, the computer system provides traffic-management instructions addressed to a traffic-management system, where the traffic-management instructions allow the vehicles to navigate through the environment as the group of vehicles.

For example, navigating through the environment as the group of vehicles may include maintaining spatial proximity of the vehicles with each other. Thus, the vehicles may collectively navigate through the environment as a common entity.

Another embodiment provides a computer-readable storage medium for use with the computer system. When executed by the computer system, this computer-readable storage medium causes the computer system to perform at least some of the aforementioned operations.

Another embodiment provides a method that may be performed by the computer system. This method includes at least some of the aforementioned operations.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
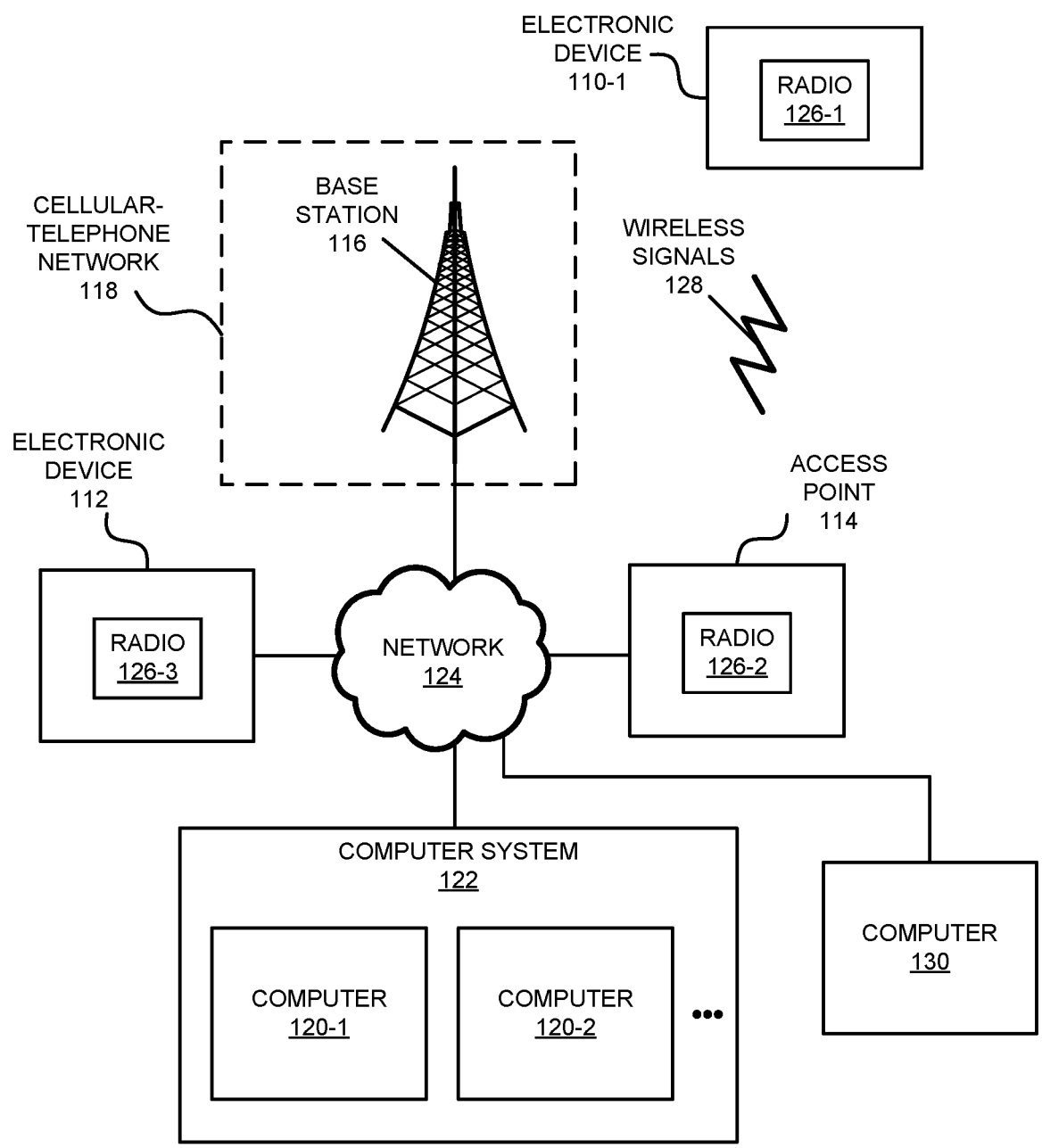
FIG. 1 is a block diagram illustrating an example of communication among electronic devices in accordance with an embodiment of the present disclosure.

In a first group of embodiments, a computer system that performs a remedial action is described. During operation, the computer system (which may include one or more computers) may receive, from one or more electronic devices, information corresponding to traffic conditions in an environment (such as a city or a municipality), where the information is associated with different types of sources distributed in the environment, and the environment includes multiple intersections and roadways. Then, the computer system may identify an event in at least a portion of the environment based at least in part on the information. Note that the event may or may not be other than a traffic event, but may impact the traffic conditions. For example, the event may include one or more of: a sporting event, an entertainment event, a weather condition, an accident, etc. Next, the computer system may perform the remedial action based at least in part on the identified event.

Alternatively or additionally, in a second group of embodiments, the computer system may determine whether the received information is self-consistent. When at least some of the information is not self-consistent, the computer system may selectively perform a second remedial action.

In some embodiments, in a third group of embodiments, the computer system may dynamically aggregate vehicles into a group of vehicles (which may include two or more vehicles) based at least in part on the traffic conditions, start locations in the environment of the vehicles and destination locations in the environment of the vehicles. Next, the computer system may provide traffic-management instructions addressed to a traffic-management system, where the traffic-management instructions allow the vehicles to navigate through the environment as the group of vehicles.

By performing the remedial action, determining whether the information is self-consistent and/or dynamically aggregating the vehicles into the group of vehicles, these traffic-management techniques may reduce the cost, simplify and/or improve the performance of a traffic-management system. For example, by using different types of sources, the traffic-management techniques may avoid the siloed nature of many existing traffic-management systems. Moreover, the traffic-management techniques may provide a dynamic, real-time response to changing conditions in a coordinated or synchronized manner over a signification portion of the environment (as opposed to a local response at a particular intersection). Furthermore, the traffic-management techniques may provide these capabilities without requiring additional cameras or sensors to be installed in intersections or along roadways, or to be included in vehicles. Consequently, the traffic-management techniques may reduce the cost and complexity of a traffic-management system. Additionally, by leveraging the different types of sources, the traffic-management techniques may allow unreliable or suspect data to be eliminated or to bound or limit the impact of such data in a traffic-management system. Therefore, the traffic-management techniques may increase the reliability or trustworthiness of alerts, instructions and/or remedial actions provided by or performed by a traffic-management system. These capabilities of the traffic-management techniques may result in improved traffic conditions, increased commercial activity, and reduce pollution and carbon emissions, which are beneficial to drivers, businesses and municipalities.

Note at least a portion of the traffic-management techniques may be implemented in a distributed or decentralized manner. Alternatively, in some embodiments, at least a portion of the traffic-management techniques may be implemented in a centralized manner.

In the discussion that follows, electronic devices (such as vehicles and/or computers) may communicate packets or frames with wired and/or wireless networks (e.g., via access points, radio nodes and/or base stations) in accordance with a wired communication protocol (such as an Institute of Electrical and Electronics Engineers or IEEE 802.3 standard, which is sometimes referred to as 'Ethernet', or another type of wired interface) and/or a wireless communication protocol, such as: an IEEE 802.11 standard (which is sometimes referred to as 'Wi-Fi,' from the Wi-Fi Alliance of Austin, Texas), Bluetooth (from the Bluetooth Special Interest Group of Kirkland, Washington), a cellular-telephone communication protocol (such as 2G, 3G, 4G, 5G, Long Term Evolution or LTE, another cellular-telephone communication protocol, etc.) and/or another type of wireless interface. In the discussion that follows, Wi-Fi, a cellular-telephone communication protocol and Ethernet are used as an illustrative example. However, a wide variety of communication protocols may be used. Note that the wireless communication may occur in a variety of frequency bands, such as: a cellular-telephone communication band, a frequency band associated with a Citizens Band Radio Service, a Wi-Fi frequency band (such as a 2.4 GHz, a 5 GHz, a 6 GHz, a 7 GHz and/or a 60 GHz frequency band), etc.

FIG. 1 presents a block diagram illustrating an example of communication among one or more of electronic devices 110-1 and 112 (such as a cellular telephone, a vehicle, a computer, etc., and which are sometimes referred to as 'clients'), access point 114, base station 116 in cellular-telephone network 118, and one or more computers 120 in computer system 122 in accordance with some embodiments. For example, electronic devices 110-1 and 112 may be in an environment, such as a city, a town or a municipality. In general, the environment may include incorporated or unincorporated regions. Moreover, the environment may include multiple intersections and/or roadways. Consequently, as discussed further below, information about or corresponding to traffic conditions that us collected or aggregated in the environment may include distributed information over a wide region (as opposed to local information associated with a particular intersection or a particular portion of a roadway).

Access point 114 and base station 116 may communicate with computer system 122 via network 124 (such as the Internet) using wireless and/or wired communication (such as by using Ethernet or a communication protocol that is compatible with Ethernet), and may communicate with electronic device 110-1 using wireless communication (Wi- Fi and a cellular-telephone communication protocol, respectively). Note that access point 114 may include a physical access point and/or a virtual access point that is implemented in software in an environment of an electronic device or a computer. In addition, access point 114 and/or base station 116 may communicate with electronic device 110-1 using wireless communication, while electronic device 112 may communicate with computer system 122 via network 124.

While not shown in FIG. 1, the wired and/or wireless communication with electronic devices 110-1 and/or 112 may further occur via an intranet, a mesh network, point-to-point connections, etc., and may involve one or more routers and/or switches. Furthermore, the wireless communication may involve: transmitting advertising frames on wireless channels, detecting one another by scanning wireless channels, establishing connections (for example, by transmitting association or attach requests), and/or transmitting and receiving packets or frames (which may include the association requests and/or additional information as payloads). In some embodiments, the wired and/or wireless communication in FIG. 1 also involves the use of dedicated connections, such as via a peer-to-peer (P2P) communication technique.

Figure 9:
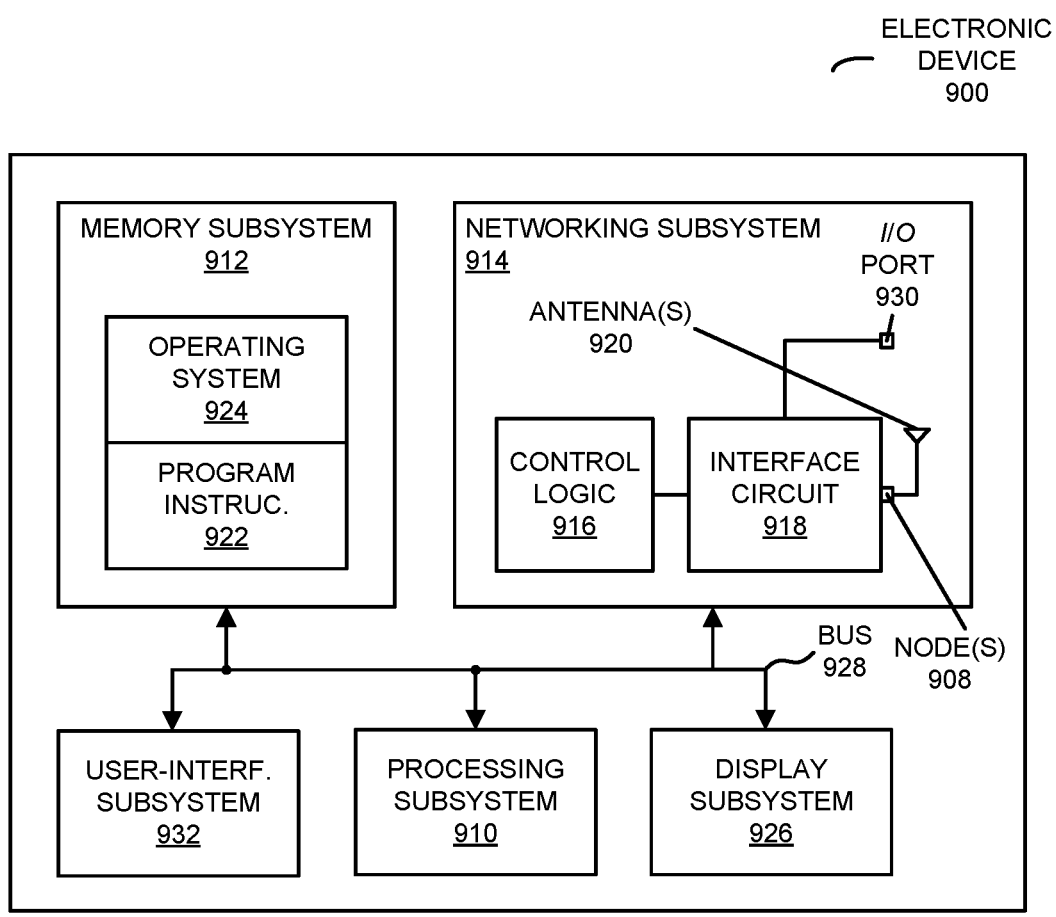
FIG. 9 is a block diagram illustrating an example of an electronic device in accordance with an embodiment of the present disclosure.

As described further below with reference to FIG. 9, electronic device 110-1, electronic device 112, access point 114, base station 116, and/or computers 120 may include subsystems, such as a networking subsystem, a memory subsystem and a processor subsystem. In addition, electronic device 110-1, access point 114 and base station 116 may include radios 126 in the networking subsystems. More generally, electronic device 110-1, electronic device 112 and access point 114 can include (or can be included within) any electronic devices with the networking subsystems that enable electronic device 110-1 and access point 114 to communicate with each other using wireless and/or wired communication. This wireless communication can comprise transmitting advertisements on wireless channels to enable access point 114 and/or electronic device 110-1 to make initial contact or detect each other, followed by exchanging subsequent data/management frames (such as association requests and responses) to establish a connection, configure security options (e.g., Internet Protocol Security), transmit and receive packets or frames via the connection, etc. Note that while instances of radios 126 are shown in electronic device 110-1 and access point 114, one or more of these instances may be different from the other instances of radios 126.

As can be seen in FIG. 1, wireless signals 128 (represented by a jagged line) are transmitted from radio 126-1 in electronic device 110-1. These wireless signals may be received by radio 126-2 in access point 114. Notably, electronic device 110-1 may transmit packets or frames. In turn, these packets or frames may be received by access point 114. Moreover, access point 114 may allow electronic device 110-1 to communicate with other electronic devices, computers and/or servers via network 124.

Note that the communication among components in FIG. 1 may be characterized by a variety of performance metrics, such as: a received signal strength (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

In the described embodiments processing a packet or frame in electronic device 110-1 and/or access point 114 includes: receiving signals (such as wireless signals 128) with the packet or frame; decoding/extracting the packet or frame from received wireless signals 128 to acquire the packet or frame; and processing the packet or frame to determine information contained in the packet or frame.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As described previously, existing traffic-management solutions are often inflexible, expensive and complicated. As described further below with reference to FIGS. 2-8, in order to address these problems, computer system 122 may implement the traffic-management techniques. Notably, the traffic-management techniques may leverage different types of sources distributed through an environment to facilitate reliable real-time or dynamic traffic management.

For example, in some embodiments, computer system 122 may receive information corresponding to traffic conditions in an environment (such as traffic flows), where the information is associated with different types of sources distributed in the environment, and the environment includes multiple intersections and roadways. For example, the information may be received from electronic devices 110-1 and/or 112 in an environment, such as a city or a municipality.

Then, computer system 122 may identify an event in at least a portion of the environment based at least in part on the information. For example, the event may be identified based at least in part on: historical traffic conditions in the environment; a detected previous or a predicted future change in a traffic condition in the environment (such as in the next 5, 10, 30 or 60 min.). In some embodiments, identifying the event may include comparing the traffic conditions to predefined signatures of different types of events. Note that identifying the event may be based at least in part on a pretrained predictive model, such as a machine-learning model or a neural network.

Next, computer system 122 may perform a remedial action based at least in part on the identified event. For example, computer system 122 may: provide an alert about the event (e.g., to pedestrians or drivers in at least the portion of the environment, such as a vehicle that includes electronic device 110-1); providing an instruction based at least in part on the event (e.g., to the drivers in at least the portion of the environment); and/or modifying traffic management (such as road signage, traffic signal timing, etc.) in at least the portion of the environment (e.g., by providing instructions to a computer 130 associated with a traffic-management system).

In some embodiments, computer system 122 may check the received information to ensure that it is self-consistent, e.g., with itself or with expected traffic conditions at a location and a given timestamp in the environment (such as based at least in part on historical traffic conditions and/or estimated traffic conditions based at least in part on an output of a pretrained predictive model). This capability may allow computer system 122 to identify unreliable, suspicious or repetitive data, and to remove or exclude such data from subsequent operations of computer system 122 (such as inclusion in a dataset that is used to dynamically retrain a pretrained predictive model or to determine a modification to traffic management). More generally, when information is not self-consistent, computer system 122 may selectively perform a remedial action.

Additionally, in some embodiments, computer system 122 may dynamically aggregates vehicles into a group of vehicles. For example, based at least in part on traffic conditions corresponding to the received information, as well as start locations and destination locations of the vehicles, computer system 122 may dynamically aggregate the vehicles into the group of vehicles. Then, computer system 122 may provide traffic-management instructions addressed to a traffic-management system (such as computer 130), where the traffic-management instructions allow the vehicles to navigate through the environment as the group of vehicles. For example, navigating through the environment as the group of vehicles may include maintaining spatial proximity of the vehicles with each other. Thus, the vehicles may collectively navigate through the environment as a common entity.

In these ways, the traffic-management techniques may leverage real-time communication with traffic signals to reduce congestion on roadways, provide coordinated right-of-way for emergency vehicles, and/or reduce accidents at intersections with traffic signals.

While the preceding embodiments illustrated the traffic-management techniques being implemented via a cloud-based computer system 122, in other embodiments at least some of the aforementioned operations may be performed locally on, e.g., electronic device 110-1 or 112. Thus, operations in the traffic-management techniques may be performed locally or remotely.

Figure 2:
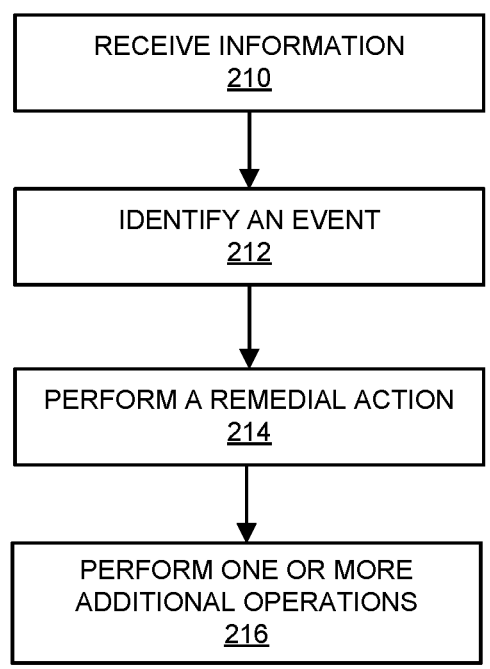
FIG. 2 is a flow diagram illustrating an example of a method for performing a remedial action using a computer system of FIG. 1 in accordance with an embodiment of the present disclosure.

We now describe embodiments of a method. FIG. 2 presents a flow diagram illustrating an example of a method 200 for performing a remedial action using a computer system, such as one or more computers 120 in computer system 122 (FIG. 1). During operation, the computer system may receive information (operation 210) corresponding to traffic conditions in an environment, where the information is associated with different types of sources distributed in the environment, and the environment includes multiple intersections and roadways. In the present disclosure, a 'traffic condition' may include one or more of: a number or density of vehicles on a portion of a roadway or proximate to an intersection; types of vehicles (such as bicycles, scooters, motorcycles, cars, trucks, buses, delivery vehicles, garbage trucks, emergency vehicles, etc.) on the portion of the roadway or proximate to the intersection; a number of pedestrians proximate to a roadway, an intersection or at a mass-transit location (such as walking on the sidewalk or waiting at a bus stop); a speed of traffic; acceleration or deceleration of traffic; the occurrence of or proximity to a phase transition in traffic flow (such as stop and go traffic); disruptions or changes to traffic flow (such as an accident, police, ambulance or fire department activity, etc.); deviations of a vehicle (such as a bus) from a schedule or when the vehicle is on time or following the schedule; when traffic has come to a stop, how long it has been stopped, how many vehicles are waiting, etc.; a number of people using mass transit; traffic signal states; traffic signal periods or patterns; or another factor that directly or indirectly impacts a traffic condition or reflects or indicates the traffic condition.

Note that the environment may include at least a portion of a city or a municipality. Moreover, at least some of the information may include real-time information, such as information that is received as it is acquired by a given type of source. As discussed further below, this may allow the computer system to dynamically and appropriately respond in a timely manner to changing traffic conditions in the environment.

Furthermore, receiving the information (operation 210) may include accessing the information in memory associated with the computer system and/or receiving the information from the different types of sources. In some embodiments, the types of data sources may include data associated with one or more of: emergency services calls, municipal or private vehicles (such as emergency-services vehicles, waste-removal vehicles, public-works vehicles, vehicles associated with another municipal agency, autonomous-driving vehicles, etc.), navigation software, mass transit systems (such as mass-transit vehicles, trains, buses, etc.), rideshare software or rideshare vehicles, taxis, calendar software (such as the planned or future schedules of one or more individuals or organizations), parking meters, parking lots, airborne or terrestrial unmanned drones or robots, etc. Note that the use of or merging of disparate and/or geographically distributed types of sources may avoid the adverse effects of siloed information.

Then, the computer system may identify an event (operation 212) in at least a portion of the environment based at least in part on the information. Moreover, identifying the event may be based at least in part on historical traffic conditions in the environment. Furthermore, identifying the event may include predicting a change in a traffic condition in the environment in a subsequent time interval. Alternatively or additionally, identifying the event may include determining a change in the traffic conditions after the predicted change has occurred. In some embodiments, identifying the event may include comparing the traffic conditions to predefined signatures of different types of events (such as traffic conditions associated with different types of events). Note that identifying the event may be based at least in part on a pretrained predictive model, such as a machine-learning model or a neural network.

In some embodiments, the event may or may not be other than a traffic event, but may impact the traffic conditions. For example, the event may include one or more of: a sporting event, an entertainment event (such as a concert or a theatrical performance), a weather condition, a political event, a conference, terrorism, etc. Alternatively, the event may include an accident.

Next, the computer system may perform a remedial action (operation 214) based at least in part on the identified event. For example, the remedial action may include: providing an alert about the event (e.g., to pedestrians, cyclists or drivers in at least the portion of the environment); providing an instruction based at least in part on the event (e.g., to the drivers in at least the portion of the environment); and/or modifying traffic management (such as road signage, traffic signal timing, etc.) in at least the portion of the environment. Notably, when the event includes an accident at a location in the environment, the modification to the traffic management (such as a traffic-signal period or warning signs) may dynamically reduce a probability of a future occurrence of an accident at the location. Alternatively or additionally, modifying the traffic management may include changing: a number of vehicles in a group of vehicles allowed through an intersection during a traffic-signal cycle and/or a spacing between vehicles in the group. In some embodiments, where the event includes an emergency services response to a 911 call), modifying the traffic management may include adjusting the timing of multiple traffic signals along a route to allow emergency vehicles to safely and efficiently reach a destination (such as a location of the 911 call or a potential emergency) with reduced or improved transit time and reduced acceleration and deceleration.

Moreover, the alert or the instruction may be provided to delivery vehicles, such as trucks, unmanned drones or robots. For example, the alert or instruction may provide a truck, a drone or a robot information that, directly or indirectly, indicates how to address the identified event (such as a preferred route to a destination, specific portions of the environment to avoid at certain timestamps, etc.).

In some embodiments, the alert or the instructions is based at least in part on a predicted impact of or corresponding to the event on a future traffic condition, e.g., because of a modification in traffic management associated with the event. Note that the alert or the instruction may be provided to users or drivers (or electronic devices of users or drivers) in a synchronized or coordinated manner. For example, the alert or the instruction may be provided in a staggered manner (such as with a determined delay or latency) to the users or drivers in different zones or regions in the environment based at least in part on the predicted impact on the traffic conditions of the responses of the users or drivers to the alert or the instruction.

In some embodiments, the computer system performs one or more optional additional operations (operation 216). For example, the remedial action may include or may be based at least in part on: dividing the environment into multiple zones or regions; and dynamically controlling traffic flows between the different regions based at least in part on predefined traffic parameters or constraints.

Figure 3:
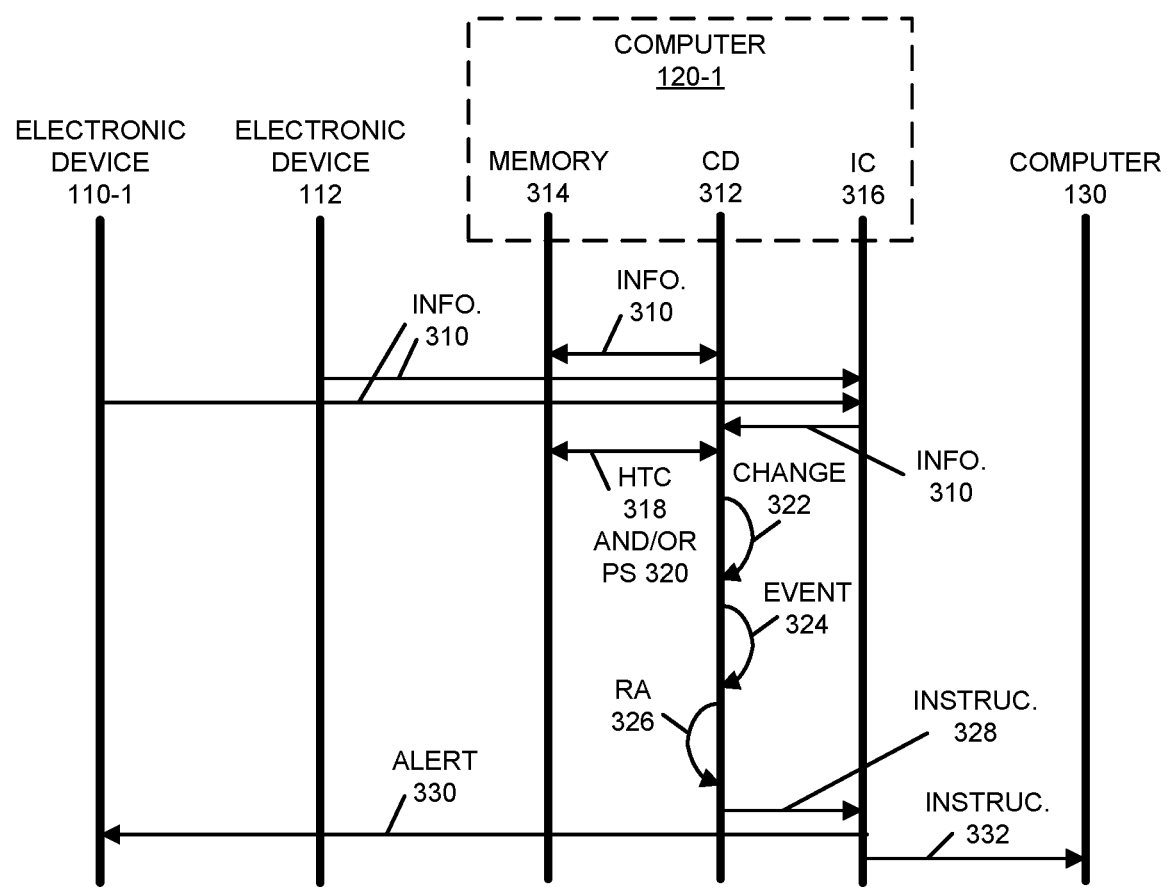
FIG. 3 is a drawing illustrating an example of communication among electronic devices in FIG. 1 in accordance with an embodiment of the present disclosure.

FIG. 3 presents a drawing illustrating an example of communication among electronic device 110-1, electronic device 112, computer 120-1 and computer 130. During the traffic-management techniques, computer 120-1 may receive information 310 corresponding to traffic conditions in an environment. For example, computational device (CD) 312 (such as a processor or a graphics processing unit) in computer 120-1 may access information 310 in memory 314 in computer 120-1. Alternatively or additionally, interface circuit 316 in computer 120-1 may receive information 310 from different types of sources (ToS) distributed in the environment, such as electronic device 110-1 and/or electronic device 112. For example, electronic device 110-1 may include a municipal vehicle and electronic device 112 may include a cellular telephone executing a rideshare application or a navigation (or mapping) software.

Then, computational device 312 may identify an event 324 in at least a portion of the environment based at least in part on information 310. The event 324 may be identified based at least in part on historical traffic conditions (HTC) 318 in the environment or predefined signatures (PS) 320 of different types of events, which are accessed in memory 314. Furthermore, identifying event 324 may include determining a change 322 that occurred or predicting a change 322 in a traffic condition in the environment in a subsequent time interval.

Next, computational device 312 may perform a remedial action (RA) 326 based at least in part on the identified event 318. For example, remedial action 326 may include: instructing 328 interface circuit 316 to provide an alert 330 to drivers (e.g., via their cellular telephones or navigation software or another application executing on their cellular telephones, such as electronic device 110-1) or an instruction 332 to a traffic-management system (such as computer 130).

In some embodiments, the types of sources include data from public transportation (such as buses) and/or any type of municipal vehicle. These information or data may indicate traffic conditions along the main routes or roadways in an environment, such as a city. Thus, the information may be received from a traffic participant and may (or may not) be associated with location-based cellular-telephone data. In some embodiments, the information may be independent of a Global Positioning System (GPS). For example, the information may include or may correspond to images acquired by external and/or internal cameras on a bus or another type of municipal vehicle. This information may allow the location to be determined based at least in part on street sign(s) or identifying information associated with a particular roadway.

Note that, for a given vehicle, the data or information may include or may indicate one or more of: whether the given vehicle (such as a bus) is on schedule (or whether there is a deviation from the schedule); a speed of the given vehicle; a number of people on the vehicle; human behavior associated with the given vehicle (such as opening and/or closing of doors); a number of people waiting to board the given vehicle; a density of vehicles and associated traffic flow or traffic conditions in front of and/or behind the given vehicle; etc.

In some embodiments, the computer system may acquire one or more images from one or more cameras in a vehicle, such as a mass-transit vehicle. At least some of the information used in the traffic-management techniques may be obtained by performing an image-processing or an image-analysis technique on the one or more images. This image-processing or image-analysis technique may include: an edge or a line-segment detector, a texture-based feature detector, a texture-less feature detector, a scale invariant feature transform (SIFT)-like object-detector, a speed-up robust-features (SURF) detector, a binary-descriptor (such as ORB) detector, a binary robust invariant scalable keypoints (BRISK) detector, a fast retinal keypoint (FREAK) detector, a binary robust independent elementary features (BRIEF) detector, a features from accelerated segment test (FAST) detector, and/or another image-processing or image-analysis technique. Alternatively or additionally, in some embodiments the image may be analyzed using a pre-trained predictive or machine-learning model. In the present discussion, note that a pre-trained predictive machine-learning model may have been trained using a machine-learning technique, such as a supervised-learning technique. The supervised-learning technique may include: a classification and regression tree, a support vector machine (SVM), linear regression, nonlinear regression, logistic regression, least absolute shrinkage and selection operator (LASSO), ridge regression, a random forest, and/or another type of supervised-learning technique. In some embodiments, the pre-trained predictive or machine-learning model may include a pre-trained neural network, such as a convolutional neural network or a recurrent neural network. Note that the received information may or may not be encrypted using an encryption key or a secure hash function that is shared by one or more electronic devices (such as computer system 122 and electronic devices 110-1 and/or 112).

Figure 4:
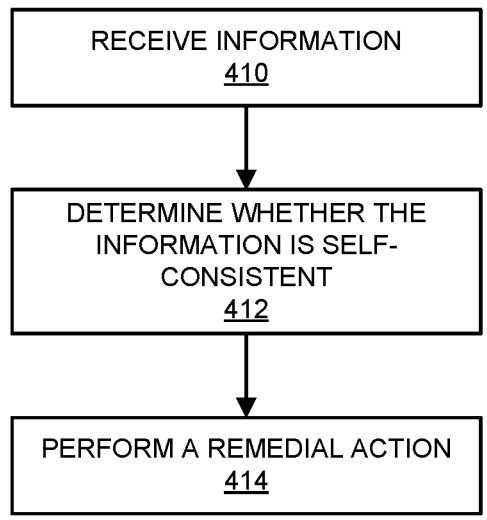
FIG. 4 is a flow diagram illustrating an example of a method for determining whether information is self-consistent using a computer system of FIG. 1 in accordance with an embodiment of the present disclosure.

FIG. 4 presents a flow diagram illustrating an example of a method 400 for determined whether information is self-consistent using a computer system, such as one or more computers 120 in computer system 122 (FIG. 1). During operation, the computer system may receive information (operation 410) corresponding to traffic conditions in an environment, where the information is associated with different types of sources distributed in the environment, and the environment includes multiple intersections and roadways. Note that the environment may include at least a portion of a city or a municipality. In some embodiments, the types of data sources may include data associated with one or more of: emergency services calls (such as 911 calls), municipal or private vehicles (such as emergency-services vehicles, waste-removal vehicles, public-works vehicles, vehicles associated with another municipal agency, etc.), navigation software, mass transit systems (such as mass-transit vehicles, trains, buses, etc.), rideshare software or rideshare vehicles, calendar software (such as the planned or future schedules of one or more individuals or organizations), parking meters, parking lots, etc.

Then, the computer system may determine whether the information is self-consistent (operation 412). (More generally, the computer system may determine whether the information is correct or reliable.) Next, the computer system may selectively perform a remedial action (operation 414) when at least some of the information is not self-consistent.

Note that at least some of the information associated with the different types of sources may be redundant, overlapping or concerning the same thing. For example, at least some of the redundant information may be associated with a common traffic condition in the environment and/or a common intersection or roadway in the environment. Notably, there may be information from at least two different types of sources that is associated with a roadway, an intersection or a traffic condition on the roadway or in the intersection at a given timestamp. The self-consistency of this information may be determined by comparing the information from the different types of sources. When there is a difference, either or both of these types of sources may be deemed unreliable or lacking self-consistency in the information. Thus, when data from one type of source (such as a ridesharing application) indicates traffic is moving slowly (below the speed limit) at the current timestamp, while data from another type of source (such as a municipal vehicle, such as a bus) indicates that traffic is moving at the speed limit at the current timestamp, the ridesharing-application data may be deemed incorrect or unreliable because of this lack of self-consistency.

Alternatively, a particular type of source (such as data associated with municipal vehicles) may be deemed to be more reliable or the types of sources may have associated reliability values or metrics in a predefined reliability hierarchy, such as: data for municipal vehicles may be deemed inherently more reliable than data associated with an external source (outside of the municipality), such as data associated with a consumer application (e.g., navigation software, rideshare software, etc.). In some embodiments, agreement among a majority of the types of sources may be deemed reliable or self-consistent, and one or more types of sources that are outliers may be deemed unreliable or lacking self-consistence.

Furthermore, determining whether the information is self-consistent may be based at least in part on predefined rules associated with historical traffic conditions in the environment (e.g., at a given timestamp). For example, deviations or changes from a historical traffic pattern or flow (and, more generally, a traffic condition) at the given timestamp may be deemed suspicious (or lacking self-consistency) in the absence of an explanation (such as the identification of an event that can impact of the change the traffic condition. Alternatively, determining whether the information is self-consistent may be based at least in part on a comparison of the traffic conditions corresponding to the information and predicted traffic conditions (e.g., using a pretrained predictive model, such as a machine-learning model and/or a neural network) based at least in part on the information and/or historical traffic conditions in the environment (e.g., at a given timestamp).

When at least some of the information is not self-consistent or is deemed unreliable, the remedial action may include excluding this data in the information (such as conflicting data). Alternatively or additionally, redundant data in the information (such as duplicate or temporally repeating data) may be deemed as lacking self-consistency and may be removed or excluded by the computer system. Thus, repeated instances of the same or similar data may be ignored or removed from consideration is subsequent actions of the computer system (such as a modification to traffic management). This capability may allow the computer system to avoid a spoofing attack or a denial-of-service attack.

In some embodiments, the remedial action may include bounding or limiting a modification to traffic management (such as road signage, traffic signal timing, etc.) in at least a portion of the environment based at least in part on the information. This capability may prevent or limit an adverse impact of data that is suspect or incorrect. For example, the modification to the traffic management may be constrained by one or more historical traffic conditions at a given location in at least the portion of the environment. Consequently, the final or output modification to the traffic management may be determined based at least in part on low-pass filtering, systematic underrelaxation (such as limiting a given modification to less than a 1-5% change from previous traffic-management parameters or settings, e.g., a traffic-signal timing or period) or averaging with the one or more historical traffic conditions and an estimated or predicted traffic condition associated with an initial modification to the traffic management. This may ensure that any changes or modifications are incremental and take place over a time interval (such as up to 1, 5, 10 or 30 min).

Figure 5:
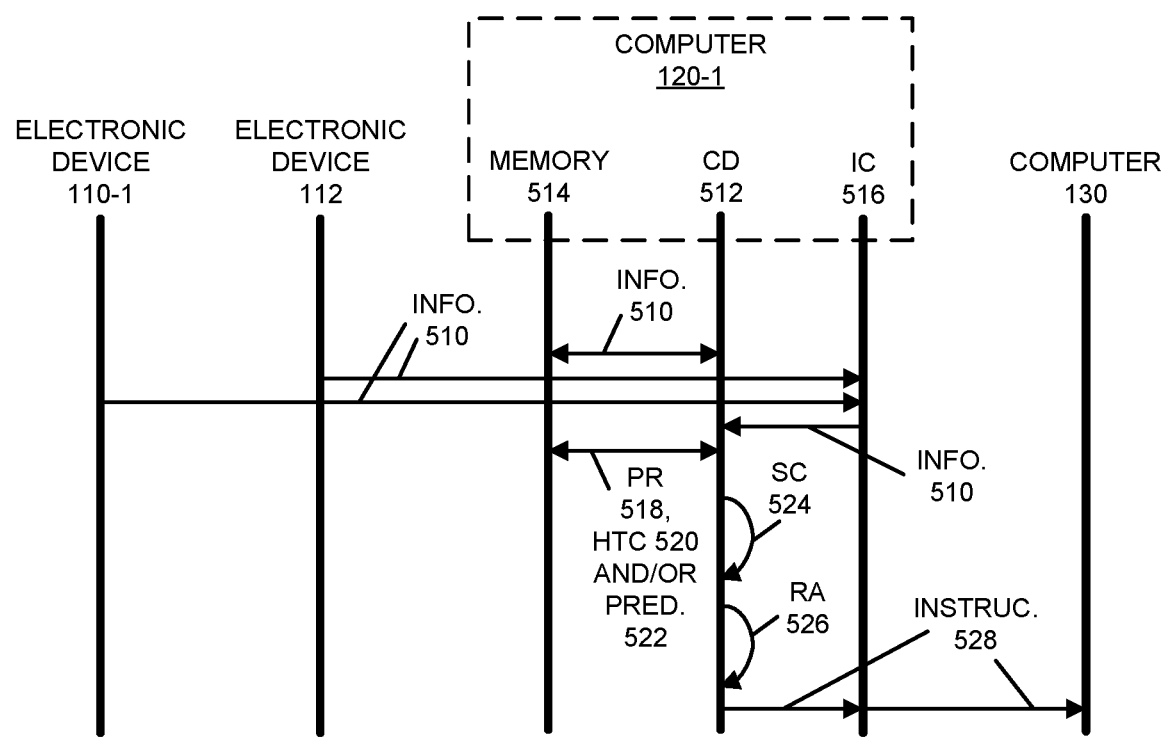
FIG. 5 is a drawing illustrating an example of communication among electronic devices in FIG. 1 in accordance with an embodiment of the present disclosure.

FIG. 5 presents a drawing illustrating an example of communication among electronic device 110-1, electronic device 112, computer 120-1 and computer 130. During the traffic-management techniques, computer 120-1 may receive information 510 corresponding to traffic conditions in an environment. For example, computational device (CD) 512 (such as a processor or a graphics processing unit) in computer 120-1 may access information 510 in memory 514 in computer 120-1. Alternatively or additionally, interface circuit 516 in computer 120-1 may receive information 510 from different types of sources (ToS) distributed in the environment, such as electronic device 110-1 and electronic device 112. For example, electronic device 110-1 may include a municipal vehicle and electronic device 112 may include a cellular telephone executing a rideshare application or a navigation (or mapping) software.

Then, computational device 512 may determine whether information 510 is self-consistent (SC) 524. For example, computational device 512 may compare information 510 to itself (such as overlapping or redundant information). These comparisons may involve different types of sources, and may confirm that at least a majority of the information is in agreement with each other. Outliers that differ from the majority may be deemed unreliable or lacking self-consistency. Note that in the comparisons, at least some of the information associated with one or more type of sources may be deemed more reliable that information associated with one or more other types of sources.

Moreover, the determining may be based at least in part on predefined rules (PR) 518 and/or a historical traffic conditions (HTC) 520, which are accessed in memory 514. Alternatively or additionally, the determining may be based at least in part one one or more predictions 522 e.g., such as one or more traffic conditions predicted using a pretrained predictive model.

Next, computational device 512 may selectively perform a remedial action (RA) 526 when at least some of information 510 is not self-consistent. For example, unreliable or information lacking self-consistency may be excluded or removed. Alternatively or additionally, redundant data in the information (such as duplicate or temporally repeating data) may be deemed as lacking self-consistency and may be removed or excluded by computational device 512. In some embodiments, remedial action 526 may include determining an instruction 528 that is provided by interface circuit 516 addressed to a traffic-management system (such as computer 130). Instruction 528 may modify road signage, traffic signal timing, etc. based at least in part on at least a portion of information 510 that is deemed reliable or self-consistent. Note that the modification provided to the traffic-management system (including a centralized traffic-management computer system and/or a distributed components in the traffic-management system) may be bounded or limited, e.g., so that suspect or incorrect data does not adversely impact the traffic-management system.

Figure 6:
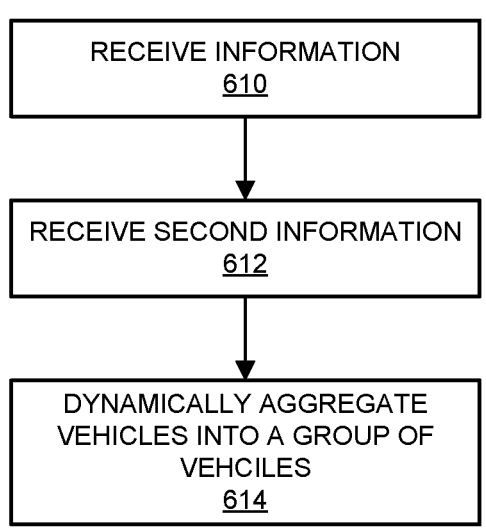
FIG. 6 is a flow diagram illustrating an example of a method for dynamically aggregating vehicles into a group of vehicles using a computer system of FIG. 1 in accordance with an embodiment of the present disclosure.

FIG. 6 presents a flow diagram illustrating an example of a method 600 for dynamically aggregates vehicles into a group of vehicles using a computer system, such as one or more computers 120 in computer system 122 (FIG. 1). During operation, the computer system may receive information (operation 610) corresponding to traffic conditions in an environment, where the information is associated with different types of sources distributed in the environment, and the environment includes multiple intersections and roadways. Note that the environment may include at least a portion of a city or a municipality. Then, the computer system may receive second information (operation 612) corresponding to start locations in the environment of the vehicles and destination locations in the environment of the vehicles.

Moreover, the computer system may dynamically aggregate the vehicles into the group of vehicles (operation 614) based at least in part on the traffic conditions, the start locations and the destination locations. For example, the computer system may calculate that the vehicles will have a reduced transit time from their start locations to their destination locations when they transit or navigate through the environment in the group of vehicles. In some embodiments, the calculation may use or may leverage a scheduling or network-queue-management technique for improving or optimizing packet transport in a router or a switch in a network, as well as physics-based constraints (such as constraints on a spacing between vehicles, acceleration and deceleration rates of a given vehicle, etc.). Note that depending on the time of day, day of the week, time of year, and/or the traffic conditions, the computer system may include fewer or more vehicles in the group of vehicles. Notably, the number of vehicles in the group of vehicles may be based at least in part on estimated transmit times of the vehicles in the group of vehicles (such as estimated transmit times that are computed using a pretrained predictive model, e.g., a machine-learning model and/or a neural network). In general, the group of vehicles may include two or more vehicles that share at least a portion of their routes from their start locations to their destination locations, and for which the estimated transit times of each of the two or more vehicles is reduced when included in the group of vehicles (when compared to the estimated transit times when not included in the group of vehicles). However, when it is not advantageous (e.g., when the transmit times of each of the vehicles is reduced), the computer system may not aggregate the group of vehicles, e.g., each car may independently navigate through the environment.

Next, the computer system may provide traffic-management instructions (operation 616) addressed to a traffic-management system, where the traffic-management instructions allow the vehicles to navigate through the environment as the group of vehicles. For example, the instructions may be provided to a centralized portion of the traffic-management system or to individual traffic signals or lights (along a route of the group of vehicles) in a distributed portion of the traffic-management system. Note that navigating through the environment as the group of vehicles may include maintaining spatial proximity of the vehicles with each other. Thus, the vehicles may collectively navigate through the environment as a common entity.

In some embodiments of method 200 (FIG. 2), 400 and/or 600, there may be additional or fewer operations. Furthermore, the order of the operations may be changed, there may be different operations and/or two or more operations may be combined into a single operation.

Figure 7:
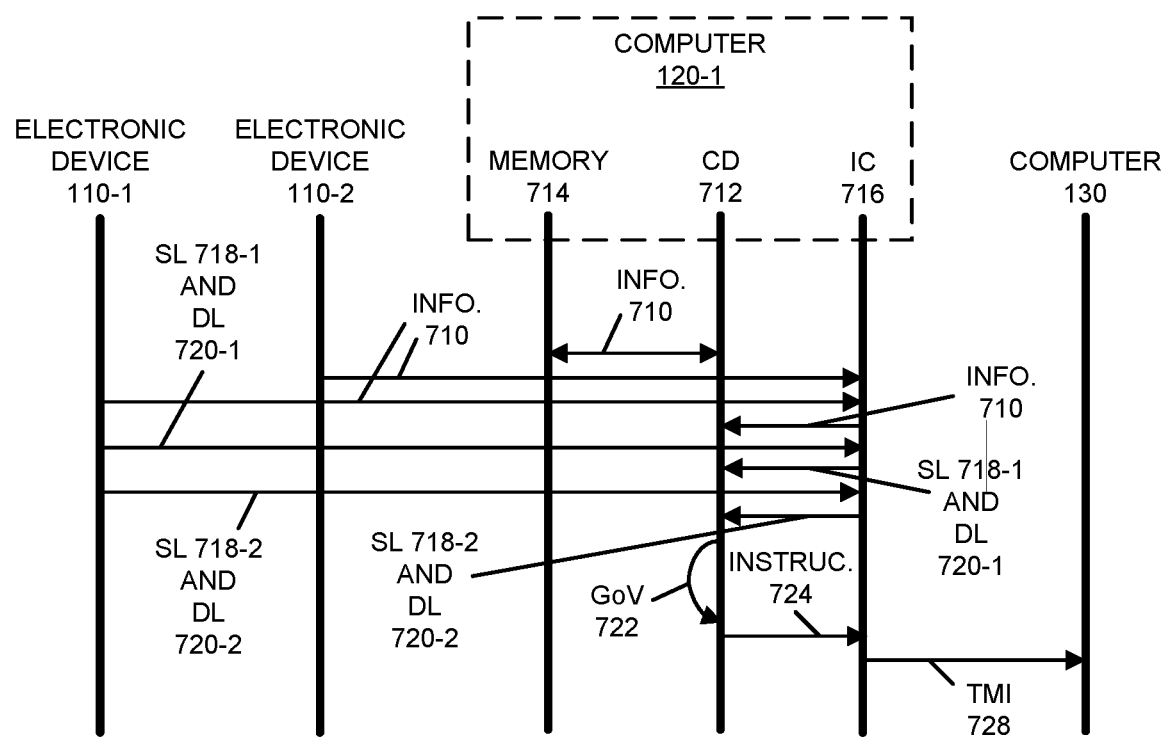
FIG. 7 is a drawing illustrating an example of communication among electronic devices in FIG. 1 in accordance with an embodiment of the present disclosure.

FIG. 7 presents a drawing illustrating an example of communication among electronic device 110-1, electronic device 110-2, computer 120-1 and computer 130. Note that electronic device 110-1 may be included in a first vehicle and electronic device 110-2 may be included in a second vehicle. During the traffic-management techniques, computer 120-1 may receive information 710 corresponding to traffic conditions in an environment. For example, computational device (CD) 712 (such as a processor or a graphics processing unit) in computer 120-1 may access information 710 in memory 714 in computer 120-1. Alternatively or additionally, interface circuit 716 in computer 120-1 may receive information 710 from different types of sources distributed in the environment, such as electronic devices 110-1 and/or 110-2.

Then, electronic device 110-1 may provide start location (SL) 718-1 and a destination location (DL) 720-1 to computer 120-1. Moreover, electronic device 110-2 may provide start location 718-2 and a destination location 720-2 to computer 120-1.

After receiving start locations 718 and destination locations 720, interface circuit 716 may provide start locations 718 and destination locations 720 to computational device 712. Moreover, computational device 712 dynamically aggregate or group the first vehicle and the second vehicle into a group of vehicles (GoV) 722 based at least in part on the traffic conditions corresponding to information 710, start locations 718 and destination locations 720.

Next, computational device 712 may instruct 724 interface circuit 716 to provide traffic-management instructions (TMI) 726 addressed to a traffic-management system (such as computer 130), where the traffic-management instructions 726 allow the first vehicle and the second vehicle to navigate through the environment as the group of vehicles 722. Note that navigating through the environment as the group of vehicles 722 may include maintaining spatial proximity of the first vehicle and the second vehicle with each other, such as maintaining a spacing between the first vehicle and the second vehicle that is less than a predefined value (e.g., 1-5 car lengths or 15-100 ft). For example, the traffic-management instructions 726 may ensure that the first vehicle and the second vehicle pass through intersections together and/or that the first vehicle and the second vehicle drive sequentially without any intervening vehicles between them. Moreover, the traffic-management instructions 726 may optionally be dynamically provided to the first vehicle and the second vehicle, so that the first vehicle and the second vehicle accelerate or decelerate at the same time (e.g., without delay or lag) and with the same or a common magnitude.

While FIGS. 3, 5 and 7 illustrate communication between components using unidirectional or bidirectional communication with lines having single arrows or double arrows, in general the communication in a given operation in these figures may involve unidirectional or bidirectional communication.

Figure 8:
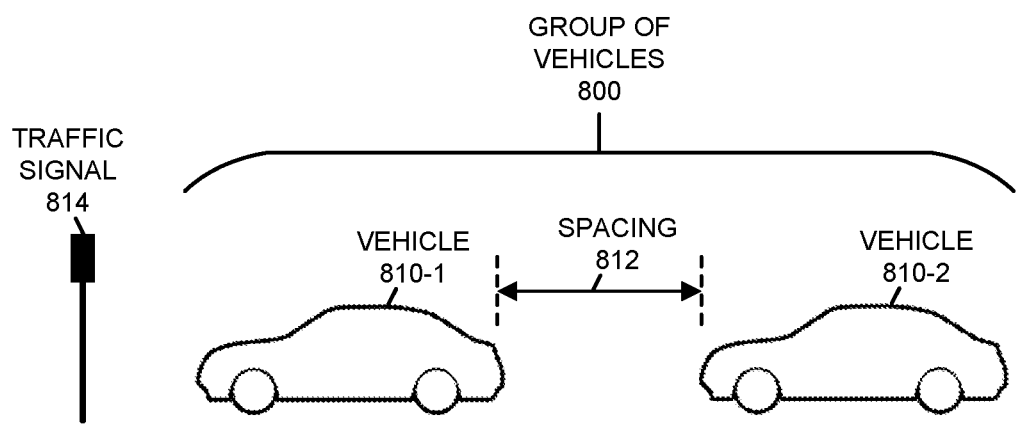
FIG. 8 is a drawing illustrating an example of a group of vehicles in accordance with an embodiment of the present disclosure.

The navigating through the environment as the group of vehicles is shown in FIG. 8 presents a drawing illustrating an example of a group of vehicles 800. Notably, the traffic-management instructions may ensure that vehicles 810 in the group of vehicles 800 may maintain spatial proximity, such as a spacing 812 that is less than a predefined value. In some embodiments, spacing 812 may be dynamically adjusted based at least in part on a speed of the group of vehicles 800, such as one car length (e.g., 15-20 ft.) per 10 mph or speed. However, in other embodiments, while spacing 812 may be dynamically adjusted based at least in part on a speed of the group of vehicles 800, spacing 812 may be less than one car length (e.g., 15-20 ft.) per 10 mph of speed. Alternatively in some embodiments, spacing 812 may be fixed, such as one car length (e.g., 15-20 ft.).

Note that the computer system may facilitate the operation of the group of vehicles 800 and the navigation of the group of vehicles 800 in the environment. For example, the traffic-management instructions may ensure each of vehicles 810 operations as a common entity, such as by jointly accelerating and decelerating at the same time (e.g., without lag or delay) or with a predefined staggered lag or delay (e.g., less than 1 s) along a sequence of vehicles in group of vehicles 800 that is less than a human lag or delay. Moreover, the group of vehicles 800 may accelerate or decelerate using a common magnitude.

Furthermore, the traffic-management instructions may ensure that that traffic signals (such as traffic signal 814) allows vehicles 810 in the group of vehicles 800 to all passthrough intersections together. For example, the group of vehicles 810 may be given priority in an intersection, such as by controlling traffic signal 814. Note that when a given vehicle (such as vehicle 810-1) reaches its destination location or a turnoff from a common route of the group of vehicles 800 for its destination location, the traffic-management instructions may remove vehicle 810-1 from the group of vehicles 800. More generally, during the navigation through the environments, one or more vehicles may be added to or removed from the group of vehicles 800.

In these ways, the dynamically aggregated group of vehicles 800 may allow vehicles 810 to navigate through the environment more efficiently than, e.g., vehicles that are not included in the group of vehicles 800. Thus, the dynamic aggregation may reduce travel times, fuel consumption and pollution associated with the group of vehicles 800.

We now further describe the traffic-management techniques. Congestion in many countries is at a point where building new roads will not improve traffic (at best, there may be a short-term improvement before stalemate occurs again). Moreover, traffic lights or signals typically indiscriminately affect all road users by physically controlling the intersection right-of-way.

The disclosed traffic-management techniques may provide improved performance, e.g., in the form of coordinated signal timing and authorized right-of-way, without the need for total system upgrades. Notably, coordinating traffic lights for the reduction of congestion may provide a major benefit to the entire economy. Moreover, reducing idle time and the continual loop of acceleration/deceleration to each light can reduce emissions, save fuel and improve safety. Furthermore, with traffic signal information, first-responder or emergency vehicles and mass-transit vehicles (such as buses) can be given advanced notice of right-of-way traffic conditions along their route.

Additionally, the traffic-management techniques may address traffic-industry pain points, such as: traffic control is typically a hardware-based industry (such as traffic signals at intersections, which are usually only adapted by at most semi-annual traffic studies by third-party consultants) and is cost-intensive; public transportation usually pays for installation, maintenance, timing studies, and cost of priority solutions, and the high cost of competing hardware solutions often means that transit agencies only have enough money for a specific section of roadway or a high-priority bus service; and emergency responders (such as fire, police and ambulance) typically use a hardware-based, line-of-sight solution, which may increase equipment maintenance problems. Note that traffic-signal maintenance and operation is usually less than 10% of a city traffic engineers responsibility. Moreover, traffic-signal timing can directly affect community well-being and the cost of doing business (such as shipping costs). Consequently, many cities and municipalities are looking for new ways of handling traffic and performing traffic control in their communities. In addition, many cities and municipalities are looking to reduce the need for specialized or proprietary hardware in traffic cabinets and on signal mast arms, which adds additional complexity and maintenance costs.

In some embodiments, the traffic-management techniques may be used in a variety of use cases, including: transit signal priority (TSP), emergency vehicle preemption (EVP), and/or signal performance metrics (SPM). Notably, in TSP, machine learning (such as one or more pretrained predictive models) may be used to dynamically adjust time-traffic signal controllers to provide well-timed priority green lights to mass-transit vehicles serving their routes with minimal disruption to cross traffic. Moreover, in EVP, one or more emergency vehicles (such as police, fire trucks and ambulances) may be tracked in in real-time and traffic-signal controllers may be instructed to provide green lights while the one or more emergency vehicles travel to reach their destination. Furthermore, in SPM, valuable, down-to-the-second insights of individual intersection activity and/or traffic-signal controller configuration and performance may be determined and/or provided.

These capabilities (which be implemented in a local and/or a cloud-based solution) may allow machine learning to be used to analyze multiple live or real-time data feeds and to prioritize the flow of vehicles by controlling traffic signals in real-time across and between entire city regions, zones or grids. Consequently, the traffic-management techniques may allow big data to be applied to traffic flow.

Moreover, the traffic-management techniques may provide: prescriptive traffic-signal timing from vehicle-arrival predictions (and, more generally, predicted traffic conditions); vehicle-arrival predictions (and, more generally, predicted traffic conditions) based at least in part on machine learning; real-time vehicle data processing and decision making; and/or standardized/simplified connection handling between different vehicle data stores.

Furthermore, the traffic-management techniques may offer: reduced cost relative to hardware-based solutions (e.g., because of the reduction or elimination of equipment at intersections); improved flexibility (such as the ability to update pretrained predictive models to address transmit route changes); and/or a less complicated implementation (e.g., communication between the computer system and a traffic-management system may occur via one electronic device that is installed at a traffic-management center in a given city or municipality, and different services, such as TSP, EVP, etc. can be added without any additional equipment).

Based at least in part on the traffic-management techniques, traffic lights in communities may rarely be manually configured by traffic engineers. Instead, the computer system may know the configuration of traffic lights based at least in part on the integrated traffic platform that uses multiple different types of sources (such as different vehicle and signal data sources) to dynamically configure traffic light. In some embodiments, the traffic-management techniques may reduce traffic in a given community by at least 30%.

Moreover, the traffic-management techniques may provide TSP and EVP in multiple communities, and may be easily deployed in a new community. Furthermore, mass-transit agencies may have increased ridership, lower fuel consumption, lower labor costs, and/or expanded service. Additionally, emergency-vehicle response times may be significantly reduced, thereby saving lives and protecting communities.

Thus, the traffic-management techniques may manage the information exchange between vehicles and roadways to control traffic signals and/or traffic signage to reduce congestion, increase safety, and/or save time. These capabilities may allow the way vehicles choose their routes around cities to be managed. Moreover, as autonomous vehicles advance into markets, the traffic-management techniques may be expanded to assist the autonomous vehicles with navigation and route planning.

Note that the traffic-management techniques may be used by a wide variety of types of customers, including: local, state and/or federal government agencies, state and local transportation departments, mass-transit agencies, police departments, fire departments, private ambulance services, traffic engineers, transit and urban planners, and/or first responders (such as an operations team).

We now describe embodiments of an electronic device, which may perform at least some of the operations in the traffic-management techniques. FIG. 9 presents a block diagram illustrating an example of an electronic device 900 in accordance with some embodiments, such as one of electronic devices 110, electronic device 112, access point 114, base station 116, one of computers 120, etc. This electronic device includes processing subsystem 910, memory subsystem 912, and networking subsystem 914. Processing subsystem 910 includes one or more devices configured to perform computational operations. For example, processing subsystem 910 can include one or more microprocessors, ASICs, microcontrollers, programmable-logic devices, one or more graphics process units (GPUs) and/or one or more digital signal processors (DSPs).

Memory subsystem 912 includes one or more devices for storing data and/or instructions for processing subsystem 910 and networking subsystem 914. For example, memory subsystem 912 can include dynamic random access memory (DRAM), static random access memory (SRAM), and/or other types of memory. In some embodiments, instructions for processing subsystem 910 in memory subsystem 912 include: one or more program modules or sets of instructions (such as program instructions 922 or operating system 924), which may be executed by processing subsystem 910. Note that the one or more computer programs may constitute a computer-program mechanism. Moreover, instructions in the various modules in memory subsystem 912 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 910.

In addition, memory subsystem 912 can include mechanisms for controlling access to the memory. In some embodiments, memory subsystem 912 includes a memory hierarchy that comprises one or more caches coupled to a memory in electronic device 900. In some of these embodiments, one or more of the caches is located in processing subsystem 910.

In some embodiments, memory subsystem 912 is coupled to one or more high-capacity mass-storage devices (not shown). For example, memory subsystem 912 can be coupled to a magnetic or optical drive, a solid-state drive, or another type of mass-storage device. In these embodiments, memory subsystem 912 can be used by electronic device 900 as fast-access storage for often-used data, while the mass-storage device is used to store less frequently used data.

Networking subsystem 914 includes one or more devices configured to couple to and communicate on a wired and/or wireless network (i.e., to perform network operations), including: control logic 916, an interface circuit 918 and one or more antennas 920 (or antenna elements) and/or input/output (I/O) port 930. (While FIG. 9 includes one or more antennas 920, in some embodiments electronic device 900 includes one or more nodes, such as nodes 908, e.g., a network node that can be coupled or connected to a network or link, or an antenna node or a pad that can be coupled to the one or more antennas 920. Thus, electronic device 900 may or may not include the one or more antennas 920.) For example, networking subsystem 914 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, a cable modem networking system, and/or another networking system.

Networking subsystem 914 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 900 may use the mechanisms in networking subsystem 914 for performing simple wireless communication between the electronic devices, e.g., transmitting advertising or beacon frames and/or scanning for advertising frames transmitted by other electronic devices as described previously.

Within electronic device 900, processing subsystem 910, memory subsystem 912, and networking subsystem 914 are coupled together using bus 928. Bus 928 may include an electrical, optical, and/or electro-optical connection that the subsystems can use to communicate commands and data among one another. Although only one bus 928 is shown for clarity, different embodiments can include a different number or configuration of electrical, optical, and/or electro-optical connections among the subsystems.

In some embodiments, electronic device 900 includes a display subsystem 926 for displaying information on a display, which may include a display driver and the display, such as a liquid-crystal display, a multi-touch touchscreen, etc.

Electronic device 900 can be (or can be included in) any electronic device with at least one network interface. For example, electronic device 900 can be (or can be included in): a computer system (such as a cloud-based computer system or a distributed computer system), a desktop computer, a laptop computer, a subnotebook/netbook, a server, a tablet computer, a smartphone, a cellular telephone, a smartwatch, a consumer-electronic device, a portable computing device, an access point, a transceiver, a router, a switch, communication equipment, a computer network device, a controller, test equipment, a printer, a car, a truck, a bus, a train, a a terrestrial or airborne drone, a robot, and/or another electronic device.

Although specific components are used to describe electronic device 900, in alternative embodiments, different components and/or subsystems may be present in electronic device 900. For example, electronic device 900 may include one or more additional processing subsystems, memory subsystems, networking subsystems, and/or display subsystems. Additionally, one or more of the subsystems may not be present in electronic device 900. Moreover, in some embodiments, electronic device 900 may include one or more additional subsystems that are not shown in FIG. 9, such as a user-interface subsystem 932. Also, although separate subsystems are shown in FIG. 9, in some embodiments some or all of a given subsystem or component can be integrated into one or more of the other subsystems or component(s) in electronic device 900. For example, in some embodiments program instructions 922 are included in operating system 924 and/or control logic 916 is included in interface circuit 918.

Moreover, the circuits and components in electronic device 900 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 914 (or, more generally, of electronic device 900). The integrated circuit may include hardware and/or software mechanisms that are used for transmitting wireless signals from electronic device 900 and receiving signals at electronic device 900 from other electronic devices. Aside from the mechanisms herein described, radios are generally known in the art and hence are not described in detail. In general, networking subsystem 914 and/or the integrated circuit can include any number of radios. Note that the radios in multiple-radio embodiments function in a similar way to the described single-radio embodiments.

In some embodiments, networking subsystem 914 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII), Electronic Design Interchange Format (EDIF), OpenAccess (OA), or Open Artwork System Interchange Standard (OASIS). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Ethernet, a cellular-telephone communication protocol and a Wi-Fi communication protocol as an illustrative example, in other embodiments a wide variety of communication protocols and, more generally, wired and/or wireless communication techniques may be used. Thus, the traffic-management techniques may be used with a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the traffic-management techniques may be implemented using program instructions 922, operating system 924 (such as a driver for interface circuit 918) or in firmware in interface circuit 918. Alternatively or additionally, at least some of the operations in the traffic-management techniques may be implemented in a physical layer, such as hardware in interface circuit 918.

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the traffic-management techniques, different numerical values may be used.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer system, comprising:
   an interface circuit configured to communicate with electronic devices;
   a processor, coupled to the interface circuit, configured to execute program instructions; and
   memory, coupled to the processor, storing the program instructions, wherein, when executed by the processor, the program instructions cause the computer system to perform operations comprising:
      receiving information corresponding to traffic conditions associated with traffic flows in an environment, wherein the information is associated with different types of sources distributed in the environment, the environment comprises multiple intersections and roadways, and the types of data sources are associated with: municipal vehicles, mass-transit vehicles, or both, and the municipal vehicles and/or mass-transit vehicles are associated with a municipal and/or a mass-transit system;
      identifying an event in at least a portion of the environment based at least in part on the information, wherein identifying the event comprises predicting a change in a traffic condition in the environment in a subsequent time interval; and
      performing a remedial action based at least in part on the identified event, wherein the remedial action is intended to impact a traffic flow associated with one or more vehicles that are different from the municipal vehicles and the mass-transit vehicles, and the one or more vehicles are not associated with the municipal and/or the mass-transit system, wherein the remedial action comprises: providing an alert about the event; providing an instruction based at least in part on the event; or modifying traffic management in at least the portion of the environment; and
      wherein modifying the traffic management comprises changing: a number of vehicles in a group of vehicles allowed through an intersection during a traffic-signal cycle, a spacing between vehicles in the group, or both.

2. The computer system of claim 1, wherein the environment comprises at least a portion of a city or a municipality.

3. The computer system of claim 1, wherein identifying the event is based at least in part on historical traffic conditions in the environment.

4. The computer system of claim 1, wherein identifying the event comprises determining a change in the traffic conditions after the predicted change has occurred.

5. The computer system of claim 1, wherein identifying the event comprises comparing the traffic conditions to predefined signatures of different types of events.

6. The computer system of claim 1, wherein the event is identified using a pretrained predictive model.

7. The computer system of claim 1, wherein at least some of the information comprises real-time information that is received as it is acquired by a given type of source.

8. The computer system of claim 1, wherein receiving the information comprises:
   accessing the information in memory associated with the computer system, receiving the information from the different types of sources, or both.

9. The computer system of claim 1, wherein, when the event comprises an accident at a location in the environment, the modification to the traffic management dynamically reduces a probability of a future occurrence of an accident at the location.

10. The computer system of claim 1, wherein the alert or the instruction is addressed to delivery vehicles.

11. The computer system of claim 1, wherein the alert or the instructions is based at least in part on a predicted impact of or corresponding to the event on a future traffic condition.

12. The computer system of claim 1, wherein the event is other than a traffic event and impacts the traffic conditions.

13. The computer system of claim 12, wherein the event comprises one or more of: a sporting event, an entertainment event, or a weather condition.

14. The computer system of claim 1, wherein the types of data sources are associated with one or more of: emergency services calls, navigation software, rideshare software, rideshare vehicles, calendar software, parking meters, or parking lots.

15. The computer system of claim 1, wherein the remedial action comprises dynamically controlling traffic flows between different predefined regions in the environment based at least in part on predefined traffic parameters or constraints.

16. A non-transitory computer-readable storage medium for use in conjunction with a computer system, the computer-readable storage medium storing program instructions, wherein, when executed by the computer system, the program instructions cause the computer system to perform operations comprising:
   receiving information corresponding to traffic conditions associated with traffic flows in an environment, wherein the information is associated with different types of sources distributed in the environment, the environment comprises multiple intersections and roadways, and the types of data sources are associated with: municipal vehicles, mass-transit vehicles, or both, and the municipal vehicles and/or mass-transit vehicles are associated with a municipal and/or a mass-transit system;
   identifying an event in at least a portion of the environment based at least in part on the information wherein identifying the event comprises predicting a change in a traffic condition in the environment in a subsequent time interval; and
   performing a remedial action based at least in part on the identified event, wherein the remedial action is intended to impact a traffic flow associated with one or more vehicles that are different from the municipal vehicles and the mass-transit vehicles, and the one or more vehicles are not associated with the municipal and/or the mass-transit system, wherein the remedial action comprises: providing an alert about the event;

providing an instruction based at least in part on the event; or modifying traffic management in at least the portion of the environment; and wherein modifying the traffic management comprises changing: a number of vehicles in a group of vehicles allowed through an intersection during a traffic-signal cycle, a spacing between vehicles in the group, or both.

17. A method for performing a remedial action, comprising:

by a computer system:

receiving information corresponding to traffic conditions associated with traffic flows in an environment, wherein the information is associated with different types of sources distributed in the environment, the environment comprises multiple intersections and roadways, and the types of data sources are associated with: municipal vehicles, mass-transit vehicles, or both, and the municipal vehicles and/or mass-transit vehicles are associated with a municipal and/or a mass-transit system;

identifying an event in at least a portion of the environment based at least in part on the information wherein identifying the event comprises predicting a change in a traffic condition in the environment in a subsequent time interval; and performing the remedial action based at least in part on the identified event, wherein the remedial action is intended to impact a traffic flow associated with one or more vehicles that are different from the municipal vehicles and the mass-transit vehicles, and the one or more vehicles are not associated with the municipal and/or the mass-transit system, wherein the remedial action comprises: providing an alert about the event; providing an instruction based at least in part on the event; or modifying traffic management in at least the portion of the environment; and wherein modifying the traffic management comprises changing: a number of vehicles in a group of vehicles allowed through an intersection during a traffic-signal cycle, a spacing between vehicles in the group, or both.

18. The method of claim 17, wherein the event is other than a traffic event and impacts the traffic conditions.

19. The method of claim 17, wherein identifying the event is based at least in part on historical traffic conditions in the environment.

20. The method of claim 17, wherein the event is identified using a pretrained predictive model.

\* \* \* \* \*